United States Patent Office 2,763,962
Patented Sept. 25, 1956

2,763,962

FUNGICIDAL FUMIGANT COMPOSITION COMPRISING BROMONITROMETHANE AND METHOD OF APPLYING TO SOIL

John L. Hardy, Midland, Mich., assignor to The Dow Chemical Company, Midland, Mich., a corporation of Delaware No Drawing. Application December 24, 1952, Serial No. 327,903

5 Claims. (Cl. 47—58)

The present invention is concerned with the fumigation of soil or growth media and is particularly directed to a method and composition for the control of soil-inhabiting fungi which attack the underground parts of plants.

It is an object of the present invention to provide an improved method for the fumigation of soil infested with fungi which attack plant roots. A further object is to provide a novel soil composition. Another object is the provision of a novel composition adapted to be employed in the new method of fumigation. Other objects will become apparent from the following specification and claims.

According to the present invention, it has been discovered that soil-inhabiting fungi which attack the underground parts of plants may be controlled by impregnating soil or growth media with a fungicidal amount of bromonitromethane. Bromonitromethane is a colorless liquid boiling at about 152.5° C. at 765 millimeters pressure and having a density of 2.030 at 25° C. The compound is somewhat soluble in many organic solvents and water, and stable under most conditions but somewhat inclined to instability on violent concussion. It possesses a mild lacrymatory property which enables it to serve as its own warning agent. Another advantage is that bromonitromethane is somewhat soluble in water and many organic solvents, and is adapted to be conveniently and readily distributed in growth media. Further, the bromonitromethane, when distributed through growth media, accomplishes a rapid control of soil-inhabiting fungal organisms. It is a further advantage that the bromonitromethane compound permeates the growth media for a distance of several inches from the point of application depending upon temperature, moisture content, compactness and physical consistency of the media.

The expression "soil" is employed in its broadest sense to be inclusive of all conventional "soils," as defined in Webster's New International Dictionary, Second Edition, Unabridged, published in 1937 by G. and C. Merriam Company, Springfield, Massachusetts. Thus, the term refers to any substance or medium in which vegetative organisms may take root and grow, and is intended to include not only earth but also compost, manure, muck, sand and the like, adapted to support plant growth.

The distribution of a minimum effective dosage of bromonitromethane in soil is essential for the practice of the invention. In general, good results are obtained when the toxicant is distributed through the soil in the amount of from about 19 to 144 parts or more by weight of the methane compound per million parts by weight of the soil. In field applications the bromonitromethane may be distributed in the soil at a dosage of from about 24 to 200 pounds or more per acre, and through such a cross-section of the soil as to provide for the presence therein of a fungicidal concentration of the toxic agent. In such applications, it is desirable that the compound be distributed to a depth of at least 2 inches. When the treatment is carried out by injection or drilling techniques, it is preferred that the maximum distance between deposits be not in excess of about 10 inches.

In carrying out the method of the present invention, the soil-dwelling fungal organisms may be controlled by impregnating the soil or growth media with the unmodified bromonitromethane. However, the present method also embraces the employment of a liquid or dust composition containing the toxicant. In such usage, the bromonitromethane may be modified with one or a plurality of additaments including solvents or other liquid carriers, dispersing and emulsifying agents and finely divided inert solids. Depending upon the concentration of toxicant, such augmented compositions are adapted to be distributed in the soil, or employed as concentrates and subsequently diluted with additional inert carrier to produce the ultimate treating compositions. The required amounts of bromonitromethane in the growth media may conveniently be supplied per acre treated, in from 10 to 13,000 gallons or more of the liquid carrier or in from 225 to 1000 pounds of the solid carrier.

The exact concentration of bromonitromethane to be employed in compositions for the treatment of growth media is not critical. The concentration of toxicant in liquid compositions employed to supply the desired dosage generally is from about 0.1 to 50 per cent by weight or higher. In dusts, the concentration of toxicant may be from about 6 to 20 per cent by weight. In compositions to be employed as concentrates, the toxicant may be present in a concentration of from about 10 to 95 per cent by weight.

Liquid compositions containing the desired amount of bromonitromethane may be prepared by dissolving the toxicant in an organic solvent such as acetone, toluene, methylene chloride and petroleum distillates, or by dispersing the toxicant in water with the aid of a suitable dispersing and emulsifying agent as may be required. The latter aqueous compositions may contain one or more water-immiscible solvents for the bromonitromethane, as desired. In such composition, the carrier comprises an aqueous emulsion, i. e. a mixture of water immiscible solvent, emulsifying agent and water. The choice of dispersing and emulsifying agent and the amount thereof employed is dictated by the nature of the composition type and by the ability of the agent to facilitate the dispersion of the bromonitromethane in the aqueous carrier to produce the desired fungicidal composition. Dispersing and emulsifying agents which may be employed in the compositions include the condensation products of alkylene oxides with phenols and organic acids, polyoxyethylene derivatives of sorbitan esters, alkyl aryl sulfonates, complex ether alcohols, mahogany soaps and the like.

In the preparation of dust compositions, the bromonitromethane is dispersed in and on a finely divided material such as chalk, talc, pyrophyllite, attapulgite, fuller's earth or bentonite. In such operation, the finely divided carrier is mixed or wet with the methane compound or a volatile organic solvent solution thereof.

A preferred embodiment of the present invention is a novel composition comprising soil in admixture with a fungicidal amount of bromonitromethane.

When operating in accordance with the present invention, the soil or growth media may be impregnated with the bromonitromethane or a composition containing the toxicant, in any convenient fashion, i. e. by simple mixing with the growth media, by employing a liquid carrier to accomplish the penetration and impregnation, or by conventional injection or drilling techniques whereby the toxicant is deposited beneath the surface of the soil. In general, it is desirable that such distribution be carried out at a soil temperature of 45° F. or higher since the effectiveness of the bromonitromethane may be somewhat reduced at lower temperatures. In an alternative method, the distribution may be accomplished by introducing the toxicant in the water employed to irrigate the soil. In this method, the amount of water may be varied in accordance with the porosity and water holding capacity of the soil in order to obtain the desired depth of distribution of the toxicant. Following the distribution of the toxicant, it is preferred that the planting operation not be carried out for about one week. When following such a practice, no adverse effect upon germination or growth of the plant crop is observed.

The following examples illustrate the invention but are not to be construed as limiting the same:

*Example 1*

Bromonitromethane was dissolved in methylene dichloride to produce a fumigant composition containing one gram of bromonitromethane per liter of the ultimate mixture. This composition was employed for the treatment of a sandy loam, seed bed which was heavily infested with the fungus organisms, Fusarium species, *Pythium de debaryanum* and *Rhizoctonia solani*. The treatment was accomplished by injection to distribute the bromonitromethane through the top 2.25 inches of soil at a relatively uniform dosage of 85 pounds per acre to give a concentration of about 118 parts by weight of the methane compound per million parts by weight of soil. The treatment was replicated 10 times.

One week later, these treated seed beds and others containing soil from untreated check plots, were then planted with cucumber seeds. About seventeen days following the seeding operations, the plots were inspected to determine the percentage emergence of disease free seedlings. From the examination, there was found to be an 80 per cent emergence of disease free seedlings, in the treated plots. In the check plots, there was an emergence of disease free seedlings of only 3 percent.

*Example 2*

Fifty parts by weight of bromonitromethane, 45 parts of chlorobenzene and 5 parts of a dimeric alkylated aryl polyether alcohol (Triton X–155) are mechanically mixed together to prepare a fumigant concentrate composition in the form of an emulsifiable liquid. In a similar manner, 90 parts by weight of bromonitromethane and 10 parts by weight of Triton X–155 are mixed together to prepare a concentrate composition in the form of a water dispersible liquid. These compositions are adapted to be dispersed in water to prepare aqueous fumigant compositions which have very desirable wetting and penetrating properties. The latter aqueous compositions may be employed to fumigate the soil and distribute bromonitromethane therein in fungicidal concentrations.

*Example 3*

88 parts by weight bromonitromethane is intimately mixed with 12 parts by weight of Triton X–155 and the resulting composition thereafter dispersed in water to prepare a composition containing about 100 pounds of bromonitromethane per 200 gallons of the ultimate mixture. The latter composition, while under agitation, is metered into irrigation water at the pump outlet at the rate of about two gallons per 100 gallons of the irrigation water. The water is in a state of turbulent flow as it comes from the pump, which provides for thorough mixing of the toxicant composition therein. About 0.5 inch of the irrigation water is applied to land, which is heavily infested with fusarium wilt of tomatoes, to accomplish the wetting of the soil to about a 5 inch depth. One week after the treatment, the soil is planted with tomato seeds. Three weeks after seeding, the resulting stand of tomato plants is examined and found substantially free of disease.

*Example 4*

In a further operation, bromonitromethane was dissolved in water to produce a fumigant composition containing about 0.5 gram of bromonitromethane per liter of the ultimate mixture. This composition was employed for the treatment of a seed bed which was heavily infested with Fusarium species. *Pythium debaryanum* and *Rhizoctonia solani*. The treatment was carried out as described in Example 1 to distribute the methane compound through the top 2.25 inches of soil at a dosage of 85 pounds of the toxicant per acre to give a concentration of about 118 parts by weight of bromonitromethane per million parts by weight of soil. The treatment was replicated ten times.

About two weeks later, these treated seed beds and untreated seed beds containing soil heavily infested with the above identified fungal organisms, were then planted with cucumber seeds. About two weeks following the seeding operations, the plots were inspected to determine the percentage emergence of disease free seedlings. From the examination, there was found to be an 86 percent emergence of disease free seedlings in the treated plots. In the check plots, an emergence of disease free seedlings of 19 percent was observed.

I claim:

1. A method which comprises impregnating soil with a fungicidal amount of bromonitromethane.

2. A method which comprises impregnating soil with bromonitromethane in the amount of at least 19 parts per million parts by weight of the soil.

3. A method which comprises impregnating field soil with bromonitromethane at a substantially uniform dosage of at least 24 pounds per acre, the impregnation being carried out through such a cross section of the soil as to provide for the presence therein of a fungicidal concentration of the methane compound.

4. A method according to claim 3 wherein the soil is impregnated with a composition comprising an aqueous emulsion of bromonitromethane.

5. A fungicidal composition comprising an aqueous emulsion of bromonitromethane, the bromonitromethane being present in a fungicidal amount.

References Cited in the file of this patent

UNITED STATES PATENTS 1,983,546    Johnson _____ Dec. 11, 1934

FOREIGN PATENTS 467,181    Canada _____ Aug. 8, 1950

OTHER REFERENCES

Analytical Chemistry, Oct. 1952, pp. 1533–1536.
Frear, Donald E. H., Chemistry of Insecticides, Fungicides and Herbicides, 2nd ed., Sept. 1948, pp. 108–125.
Chem. Abstracts, 24:143 (1930).